(12) United States Patent
Tangudu et al.

(10) Patent No.: US 10,927,892 B2
(45) Date of Patent: Feb. 23, 2021

(54) MAGNETIC THRUST BEARING

(71) Applicant: Carrier Corporation, Palm Beach Gardens, FL (US)

(72) Inventors: Jagadeesh Tangudu, South Windsor, CT (US); Parag M. Kshirsagar, South Windsor, CT (US)

(73) Assignee: Carrier Corporation, Palm Beach Gardens, FL (US)

( * ) Notice: Subject to any disclaimer, the term of this patent is extended or adjusted under 35 U.S.C. 154(b) by 34 days.

(21) Appl. No.: 16/328,036

(22) PCT Filed: Aug. 8, 2017

(86) PCT No.: PCT/US2017/045873
§ 371 (c)(1),
(2) Date: Feb. 25, 2019

(87) PCT Pub. No.: WO2018/044513
PCT Pub. Date: Mar. 8, 2018

(65) Prior Publication Data
US 2019/0257355 A1    Aug. 22, 2019

Related U.S. Application Data (63) Continuation-in-part of application No. PCT/US2016/017943, filed on Feb. 15, 2016.
(Continued)

(51) Int. Cl.
*F16C 32/04* (2006.01)
*H02K 7/09* (2006.01)

(52) U.S. Cl.
CPC ...... *F16C 32/0476* (2013.01); *F16C 32/0465* (2013.01)

(58) Field of Classification Search
CPC ... H02K 7/09; F16C 32/0476; F16C 32/0465; F16C 32/0468
(Continued)

(56) References Cited

U.S. PATENT DOCUMENTS

| 4,037,886 A | 7/1977 | Boden et al. |
| 4,196,946 A | 4/1980 | Lipscomb |

(Continued)

FOREIGN PATENT DOCUMENTS

| CN | 101761567 A | 6/2010 |
| CN | 101979888 A | 2/2011 |

(Continued)

OTHER PUBLICATIONS

Chinese Office Action dated Mar. 11, 2020 for Chinese Patent Application No. 201780053365.2.
(Continued)

*Primary Examiner* — Michael Andrews
(74) *Attorney, Agent, or Firm* — Bachman & LaPointe, P.C.

(57) ABSTRACT

A magnetic bearing (20) comprises: a rotor (22) to be supported for rotation about an axis (502); a stator (24) extending from a first end (30) to a second end (32) and comprising: one or more first permanent magnets (110); one or more second permanent magnets (112) of polarity substantially opposite to a polarity of the one or more first permanent magnets; a first axial winding (34); a second axial winding (36); a first end pole (120); and a second end pole (122).

18 Claims, 6 Drawing Sheets

Related U.S. Application Data (60) Provisional application No. 62/381,746, filed on Aug. 31, 2016, provisional application No. 62/121,443, filed on Feb. 26, 2015.

(58) Field of Classification Search
USPC .................................................. 310/90.5
See application file for complete search history.

(56) References Cited

U.S. PATENT DOCUMENTS

| | | | |
|---|---|---|---|
| 4,285,552 | A | 8/1981 | Sutter |
| 4,542,311 | A | 9/1985 | Newman et al. |
| 4,732,353 | A | 3/1988 | Studer |
| 5,179,308 | A | 1/1993 | Malsky |
| 5,202,598 | A | 4/1993 | Katsumata |
| 5,216,308 | A | 6/1993 | Meeks |
| 5,231,336 | A | 7/1993 | van Namen |
| 5,250,865 | A | 10/1993 | Meeks |
| 5,894,181 | A | 4/1999 | Imlach |
| 6,121,704 | A | 9/2000 | Fukuyama et al. |
| 6,130,494 | A | 10/2000 | Schöb |
| 6,359,357 | B1 | 3/2002 | Blumenstock |
| 6,727,616 | B1 | 4/2004 | Gabrys et al. |
| 6,727,617 | B2 | 4/2004 | McMullen et al. |
| 6,777,841 | B2 | 8/2004 | Steinmeyer |
| 6,809,450 | B1 | 10/2004 | Morrison |
| 7,038,341 | B1 | 5/2006 | Wang et al. |
| 7,262,531 | B2 | 8/2007 | Li et al. |
| 7,786,638 | B2 | 8/2010 | Pulnikov et al. |
| 7,859,144 | B1 | 12/2010 | Sahyoun |
| 7,868,510 | B2 | 1/2011 | Rittenhouse |
| 8,169,118 | B2 | 5/2012 | Filatov |
| 8,400,038 | B2 | 3/2013 | Smith et al. |
| 8,803,392 | B2 | 8/2014 | Aronstam et al. |
| 8,847,451 | B2 | 9/2014 | Filatov et al. |
| 2003/0155829 | A1* | 8/2003 | McMullen .......... F16C 32/0465 310/90.5 |
| 2010/0231076 | A1 | 9/2010 | Chiba et al. |
| 2011/0001379 | A1 | 1/2011 | McCarthy et al. |
| 2011/0163622 | A1 | 7/2011 | Filatov et al. |
| 2011/0234033 | A1* | 9/2011 | Filatov ..................... H02K 7/09 310/90.5 |
| 2012/0299422 | A1* | 11/2012 | Filatov ..................... H02K 7/09 310/90.5 |
| 2015/0330444 | A1* | 11/2015 | Wang ..................... F04D 17/10 310/90.5 |
| 2018/0238387 | A1* | 8/2018 | Tangudu .................. H02K 7/09 |

FOREIGN PATENT DOCUMENTS

| | | |
|---|---|---|
| CN | 201730962 U | 2/2011 |
| CN | 102118125 A | 7/2011 |
| CN | 102691534 A | 9/2012 |
| CN | 102305242 B | 3/2013 |
| CN | 103427538 A | 12/2013 |
| CN | 103671522 A | 3/2014 |
| CN | 205173235 U | 4/2016 |
| CN | 105570299 A | 5/2016 |
| EP | 0071456 A1 | 2/1983 |
| JP | 5319069 B2 | 10/2013 |
| WO | 97/00639 A2 | 1/1997 |
| WO | 2016/137775 A1 | 9/2016 |

OTHER PUBLICATIONS

International Search Report and Written Opinion dated May 31, 2016 for PCT/US2016/017943.

International Search Report and Written Opinion dated Oct. 23, 2017 for PCT/US2017/045873.

* cited by examiner

MAGNETIC THRUST BEARING

CROSS-REFERENCE TO RELATED APPLICATIONS

Benefit is claimed of U.S. Patent Application No. 62/381,746, filed Aug. 31, 2016, and entitled "Magnetic Thrust Bearing", the disclosure of which is incorporated by reference herein in its entirety as if set forth at length, and this application is a continuation in part of PCT/US2016/017943, filed Feb. 15, 2016 and entitled "Magnetic Bearing", which claims benefit of U.S. Patent Application No. 62/121,443, filed Feb. 26, 2015, and entitled "Magnetic Bearing", the disclosures of which applications are incorporated by reference herein in its entirety as if set forth at length.

BACKGROUND

The disclosure relates to magnetic bearings. More particularly, the disclosure relates to electromagnetic bearings utilized in turbomachines.

A well-developed art exists in active magnetic bearings. US Patent Application Publication 2011/0163622A1, published Jul. 7, 2011, discloses an electromagnetic bearing providing radial and axial support. For axial support, the stator has a pair of opposite axial poles are joined at an outer diameter (OD) by an axial back iron. An axial coil circumferentially wraps inboard of the back iron and creates a flux path through the axial poles and back iron with an inboard gap between the axial poles spanned by an actuator target formed by a rotor lamination stack within the gap.

Radially inboard of the axial coil, the stator comprises a radial actuator pole assembly formed by a lamination stack. This lamination stack has a full annulus outer ring portion and a plurality of radially-inward projections each of which is wrapped by an associated radial control coil. Adjacent the radial actuator pole assembly at opposite axial ends thereof, sandwiched between the radial actuator pole assembly and the axial poles, are a pair of permanent magnetic rings.

A pair of radial flux loops are created at opposite sides proceeding radially from the actuator target through the radial pole assembly, turning axially outboard through the permanent magnet and then radially inboard through the associated axial pole, turning back axially inward to enter the end of the actuator target and then turning back radially outward. Thus, a pair of radial fluxes of opposite sign are encircled by the axial flux loop.

Another four-radial-pole radial bearing configuration involves flux paths that pass radially and circumferentially rather than axially. In this configuration, switching can be between several conditions. One group involves flux paths with a central diametric leg through one opposed pair of poles and two circumferential legs passing circumferentially through the back iron around the respective poles of the other pair. The two pairs thus create two possible such paths with two possible directions for each path. Additionally another group involves a first flux path leg passing radially through one pole, turning circumferentially to pass through the back iron to one of the two adjacent poles and then returning back radially through that adjacent pole to meet the first leg in the shaft.

SUMMARY

One aspect of the disclosure involves a magnetic bearing comprising: a rotor to be supported for rotation about an axis; a stator extending from a first end to a second end and comprising: one or more first permanent magnets; one or more second permanent magnets of polarity substantially opposite to a polarity of the one or more first permanent magnets; a first axial winding; a second axial winding; a first end pole; and a second end pole.

In one or more embodiments of the other embodiments, the one or more first permanent magnets and the one or more second permanent magnets are non-rare earth magnets.

In one or more embodiments of the other embodiments, the magnetic bearing is a thrust bearing without radial windings.

In one or more embodiments of the other embodiments, the magnetic bearing is lacking stator laminates.

In one or more embodiments of the other embodiments, the rotor comprises a metallic core having a radial flange.

In one or more embodiments of the other embodiments, the metallic core radial flange carries an axially laminated metallic jacket.

In one or more embodiments of the other embodiments, the first end pole and second end pole extend radially inboard of the axially laminated metallic jacket.

In one or more embodiments of the other embodiments, the flange carries: a radially laminated first laminate adjacent the first end pole; and a radially laminated second laminate adjacent the second end pole.

In one or more embodiments of the other embodiments, the radially laminated first laminate is a continuous annulus and the radially laminated second laminate is a continuous annulus.

In one or more embodiments of the other embodiments, the metallic core radial flange carries an annular magnet.

In one or more embodiments of the other embodiments, the metallic core radial flange carries a magnet having essentially radial polarization.

In one or more embodiments of the other embodiments, the metallic core radial flange carries a pair of magnets of axially opposed polarization.

In one or more embodiments of the other embodiments, the one or more first permanent magnets is a first permanent magnet ring and the one or more second permanent magnets is a second permanent magnet ring.

In one or more embodiments of the other embodiments, the first permanent magnet ring is a first continuous full annulus ring and the second permanent magnet ring is a second continuous full annulus ring.

In one or more embodiments of the other embodiments, the stator further comprises: a central back iron between the one or more first permanent magnets and the one or more second permanent magnets.

In one or more embodiments of the other embodiments, the central back iron has an inner diameter rim radially inboard of the first axial winding and the second axial winding.

In one or more embodiments of the other embodiments, a method for using the magnetic bearing comprises running current through: the first axial winding; and the second axial winding, so as to: control axial force or position by simultaneously powering the first axial winding and the second axial winding.

In one or more embodiments of the other embodiments, the first and second axial windings are powered by at least one H-bridge amplifier.

In one or more embodiments of the other embodiments, the first and second axial windings are each powered by a respective associated H-bridge amplifier.

In one or more embodiments of the other embodiments, a machine comprises the bearing.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
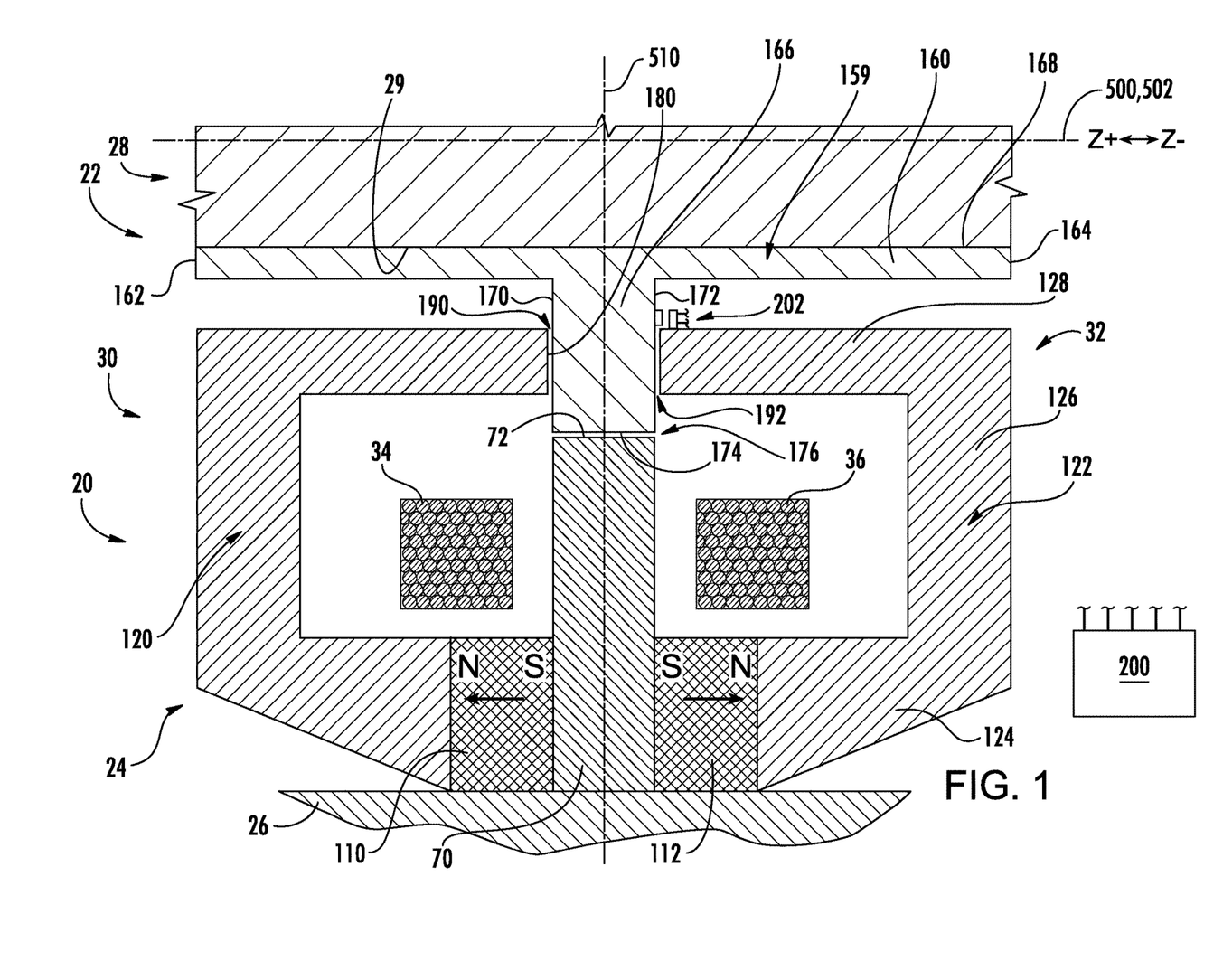
FIG. 1 is a partial, partially schematic central longitudinal axial sectional half view of an electromagnetic bearing in a compressor.

FIG. 1 shows an axial homopolar bearing 20 having a rotor 22 and a stator 24. The stator has a central longitudinal axis 500. The rotor has a central longitudinal axis 502. The axes 500 and 502 are nominally normally coincident; however, the bearing may absorb slight excursions of the rotor axis relative to the stator axis. The magnetic bearing may be used in a turbomachine (e.g., a compressor) wherein the stator is mounted to (or otherwise integrated with) a housing or case of the compressor and the rotor is mounted to (or otherwise integrated with) a shaft of the compressor. A transverse centerplane is shown as 510. For purposes of schematic illustration, the housing or case is shown as 26 and the shaft is shown as 28.

The bearing extends from a first end 30 to a second end 32. The stator includes a number of coils (e.g., metallic wire windings). For axially supporting the rotor, near the first end, the stator includes a first axial coil 34 circumscribing the axes 500, 502. Near the second end 32, the stator includes a second axial coil 36 also circumscribing the axes 500, 502. The exemplary axial coils which are around axes 500, 502 may be electrically connected in series or controlled separately so that currents through them create an axial control field that either opposes or assists the permanent magnet bias field. The direction of this permanent magnet bias field depends upon the magnetization of the permanent magnet 110, 112.

The stator comprises a first permanent magnet ring 110 (FIG. 1) and a second permanent magnet ring 112 coaxially axially spaced apart from each other. The permanent magnet rings have substantially opposite axial polarity. In this example, the south poles of both magnets face the inward to the transverse centerplane 510 and the axially-opposite north poles face axially outboard/outward. The magnet rings may be full annulus continuous rings or may be segmented (discussed below). Manufacturing tolerances will mean that exact opposite polarity may not be achieved. Typically, this will be achievable within 20° or within 10°. Some alternative configurations may involve intentionally shifting the polarities somewhat off axial so that they may be up to an exemplary 60° off anti-parallel.

Each ring 110, 112 has an inner diameter (ID) face, an outer diameter (OD) face, and opposite axial end faces. The rings 110 and 112 are mounted at opposite sides (axial ends) of a central back iron 70.

Axially outboard of the rings 110, 112 are respective end caps or end poles 120, 122. In this example, each end pole is a single circumferential piece rather than segmented (e.g., as discussed in PCT/US2016/017943). These each have a generally C-shaped half cross-section with a radially outboard sleeve portion 124, a radially extending end web 126, and a radially inboard sleeve portion 128. This defines an annular channel accommodating/receiving the associated axial winding 34, 36.

The axial coils 36, 34 on either end of the bearing may be wound circumferentially about the axes 500, 502 in opposite directions. In such a case, the coils can be either series connected or individually controlled with the currents being in the same circumferential direction with respect to the axes 500, 502. If the axial coils 36, 34 are wound in the same circumferential direction, then the direction of the currents flowing through the axial coils must be opposite to each other. The axial coils can be either series connected or individually controlled with appropriate connections.

For radially supporting the rotor, one or more separate radial bearings (e.g., mechanical bearings or magnetic bearings) may be provided. Alternatively, the bearing 20 may be an integrated bearing as disclosed in PCT/US2016/017943.

The exemplary rotor 22 comprises a metallic member 159 which, in turn, comprises the combination of a sleeve 160 and a radially outwardly extending flange 166. The sleeve extends from a first end 162 to a second end 164 and has an inboard or inner diameter (ID) surface 168. The ID surface 168 may contact the outer diameter (OD) surface 29 of the shaft 28. One exemplary attachment mechanism is a thermal shrink fit of the metallic member onto the shaft. An alternative mechanism is a keyway and set screw mechanism. In other embodiments, the metallic member 159 and shaft may be unitarily formed as a single piece. The flange has first and second axial end faces 170 and 172 and an outer diameter (OD) rim surface 174. The outer diameter surface rim 174 is spaced by a gap 176 from the inner diameter (ID) surface 72 of the central back iron 70. Similarly, the faces 170 and 172 are separated from surfaces 180 of the inboard sleeve portions 128 of the respective end poles 120 and 126 by gaps 190 and 192.

Thus, as far as the axial bearing is concerned, the FIG. 1 example lacks any laminate on either the rotor or the stator.

Figure 2:
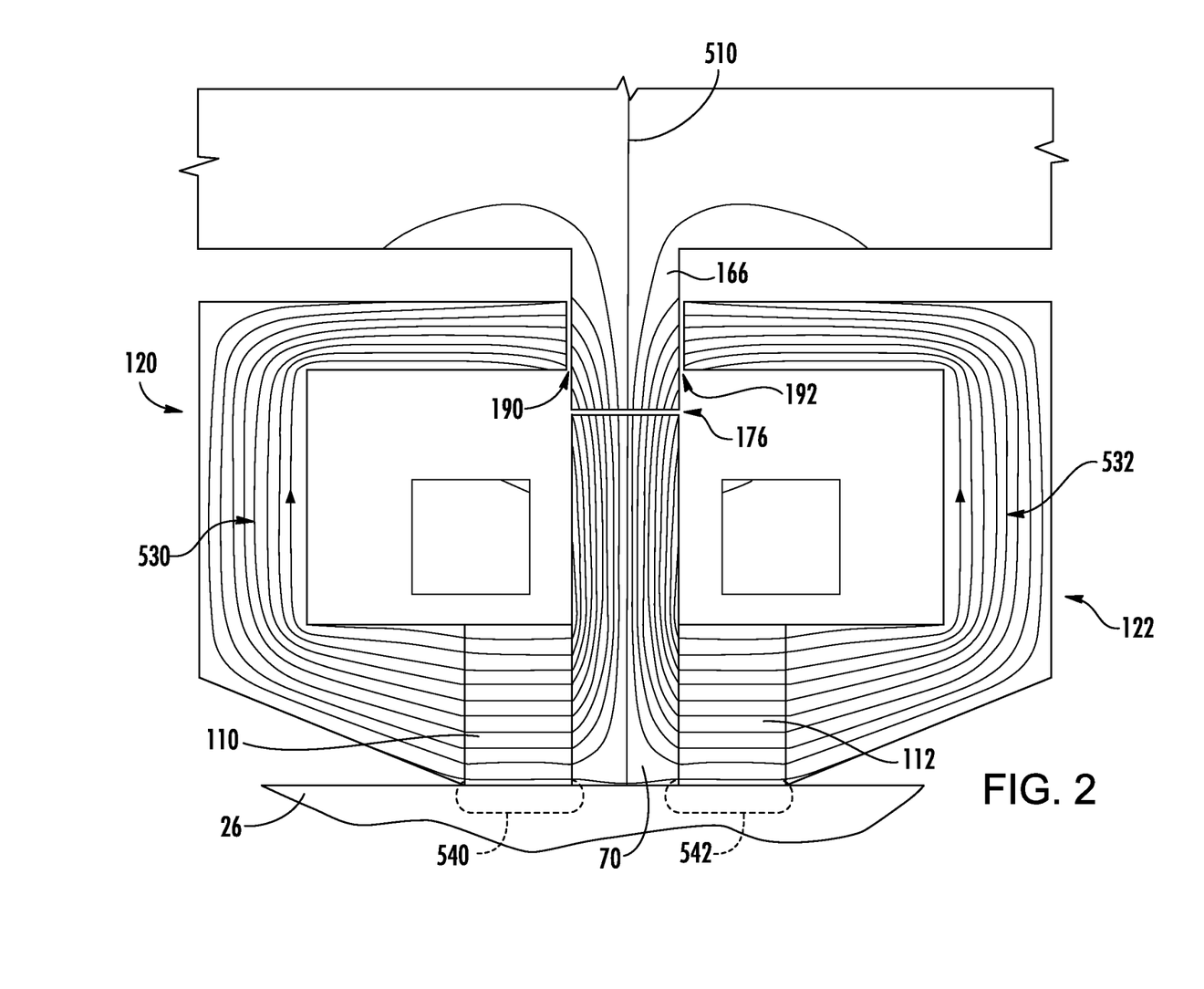
FIG. 2 is a schematic central longitudinal sectional median magnetic flux diagram of the bearing of FIG. 1.

FIG. 2 shows permanent magnet (PM) flux paths (loops) 530, 532 on the respective first and second sides of the transverse centerplane 510 (which forms a dividing plane between the two loops in this symmetric situation). For reference, a description of the first flux path starts axially at ring 110, flows axially-out, radially-in, and axially-in the end pole 120. The first flux path then crosses the axial airgap 190, enters axially into and leaves radially out from rotor flange 166, crosses the radial airgap 176 radially out. It then enters the inner diameter surface of center stator pole 70, passes radially outward in the stator pole 70 and then turns axially outward to return to the ring 110.

For reference, a description of the second flux path 532 starts axially at ring 112, flows axially-out, radially-in, and axially-in the end pole 122. The first flux path then crosses the axial airgap 192, enters axially into and leaves radially out from rotor flange 166, crosses the radial airgap 176 radially out. It then enters the inner diameter surface of center stator pole 70, passes radially outward in the stator pole 70 and then turns axially outward to return to the ring 112. FIG. 2 also shows leakage paths 540 and 542 (see PCT/US2016/017943).

These two flux paths are defined for a steady state condition when there is no current in the axial coils 34, 36. In operation, responsive to displacements sensed by the sensor 202, the controller will energize the coils to counter the displacement. For example, a displacement of the rotor in the Z– direction from a centered condition will cause the airgap 190 to become axially larger than the airgap 192. In that situation, the controller applies current to the coils so that the current in coil 34 creates flux additive to the PM flux in the first loop 530 thus increasing the flux across airgap 190 to increase the attraction force between the first end pole and the flange. Simultaneously, current in the coil 36 is subtractive to the PM flux in the second loop 532 to decrease flux across airgap 192 which in-turn reduces the attraction force between the second end pole and the rotor flange. This will tend to re-center the flange in a feedback control loop. Various algorithms may be used for the control. For example, these may include fixed incremental adjustments of the current up or down and in sign to center or the adjustments may be proportional to the sensed displacement.

Figure 6:
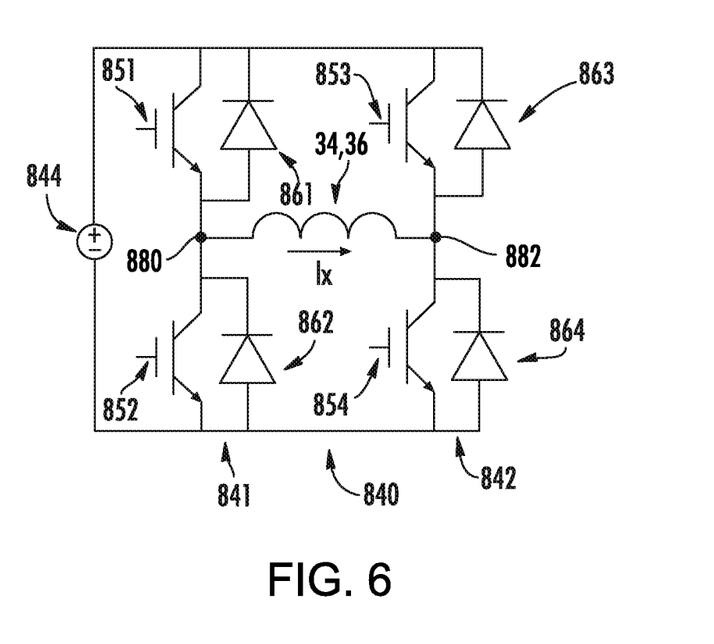
FIG. 6 is a schematic view of an H-bridge amplifier used to power one or more coils.

Electrical hardware may comprise a traditional H-bridge for control of current in the coils 34 and 36 such as in PCT/US2016/017943. FIG. 6 shows an H-bridge amplifier 840 used to power one or more coils. This may be controlled by or integrated with the controller 200. In one example, each H-bridge amplifier 840 has a single associated coil and vice-versa. This allows independent powering of the coils so that different current magnitudes may be applied to each. The amplifier 840 has two legs or branches 841 and 842 connected in parallel to a voltage source 844. The exemplary voltage source 844 is a constant DC voltage source and may be shared by the H-bridge amplifiers of the different coils.

The terminals 880 and 882 of the coil are connected across central locations of the two legs 841 and 842. To each side (high voltage and low voltage) of each leg, the terminal 880, 882 is connected to the voltage source via the parallel combination of a respective switching device 851, 852, 853, 854 and diode 861, 862, 863, 864. Exemplary switching devices are gate controlled switching devices such as insulated gate bipolar transistors (IGBT) or metal oxide field effect transistors (MOSFET). As noted above, 880 and 882 may represent terminals of an individual coil 34 or 36. Alternatively, the coils may be in series powered by a single H-bridge amplifier so that the terminal 880 is one terminal of the first coil, the terminal 882 is one terminal of the second coil, and the other terminals of the coils are connected to each other.

Figure 3:
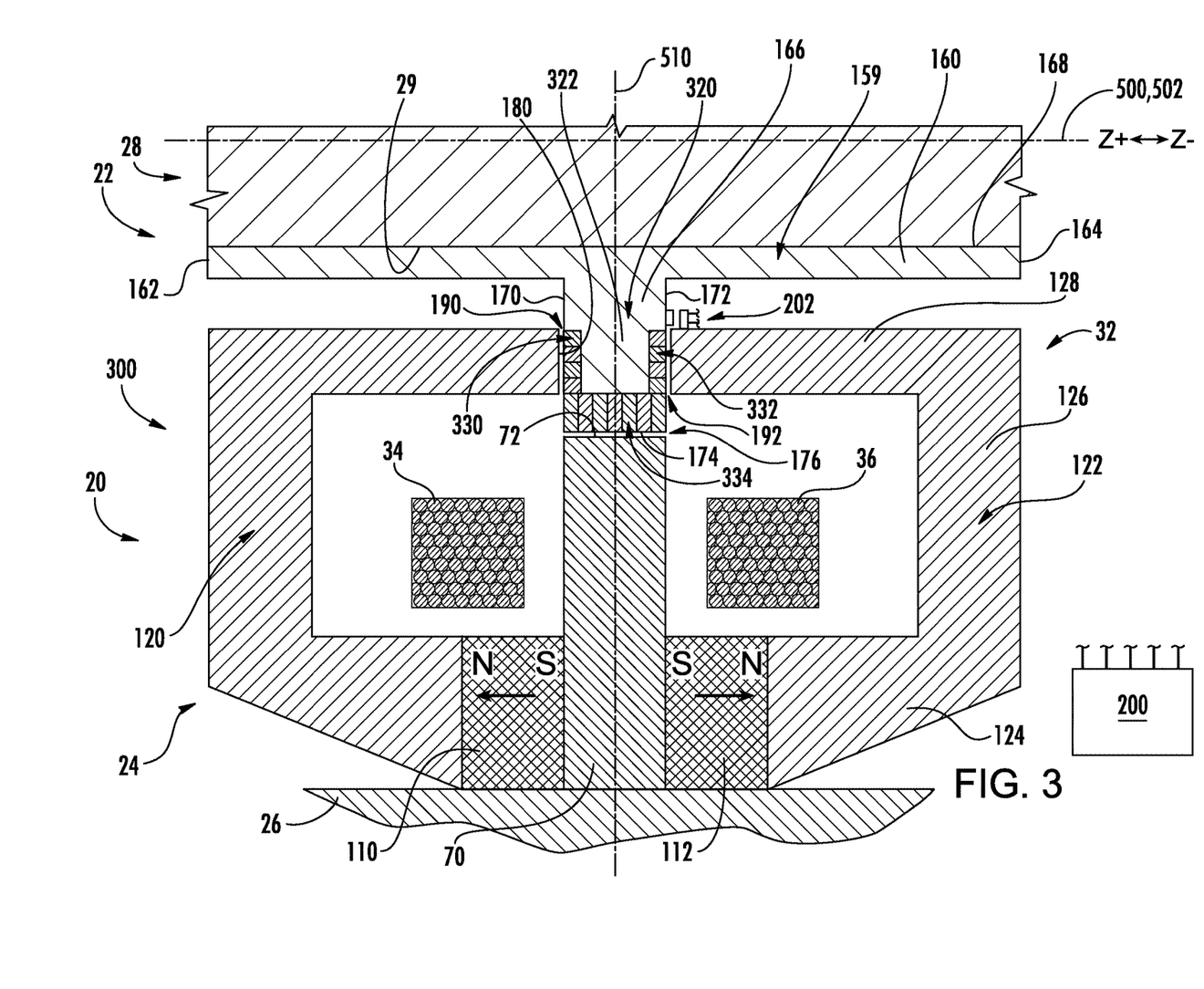
FIG. 3 is a partial, partially schematic central longitudinal axial sectional half view of a second electromagnetic bearing in a compressor.

FIG. 3 shows an alternative bearing 300 otherwise similar to the bearing 20 except for the flange 166 being replaced by a flange structure 320 having a core portion 322 formed of the monolithic metal and several laminates 330, 332, 334. The exemplary end faces of the core 322 are stepped to accommodate the laminates 330 and 332. These laminates are respectively formed as groups of concentric radial rings one inboard of another. These, for example, may be formed as sections of tube of progressively smaller diameter from outboard to inboard. The laminate 334 is formed as an axial stack of disks whose inner diameter (ID) boundaries contact the outboard rim of the flange core 322 and the adjacent outer diameter surfaces of the outboardmost rings in the laminates 330 and 332, respectively.

In operation, the laminates 330 and 332 function to reduce impact of Eddy current caused by the high frequency variation in control current used to regulate the rotor axial position. These laminates thus reduce the impact of rotor losses due to eddy currents. The laminate 334 functions to also reduce the impact of Eddy currents and corresponding losses and thereby reduce heating of rotor components.

Figure 4:
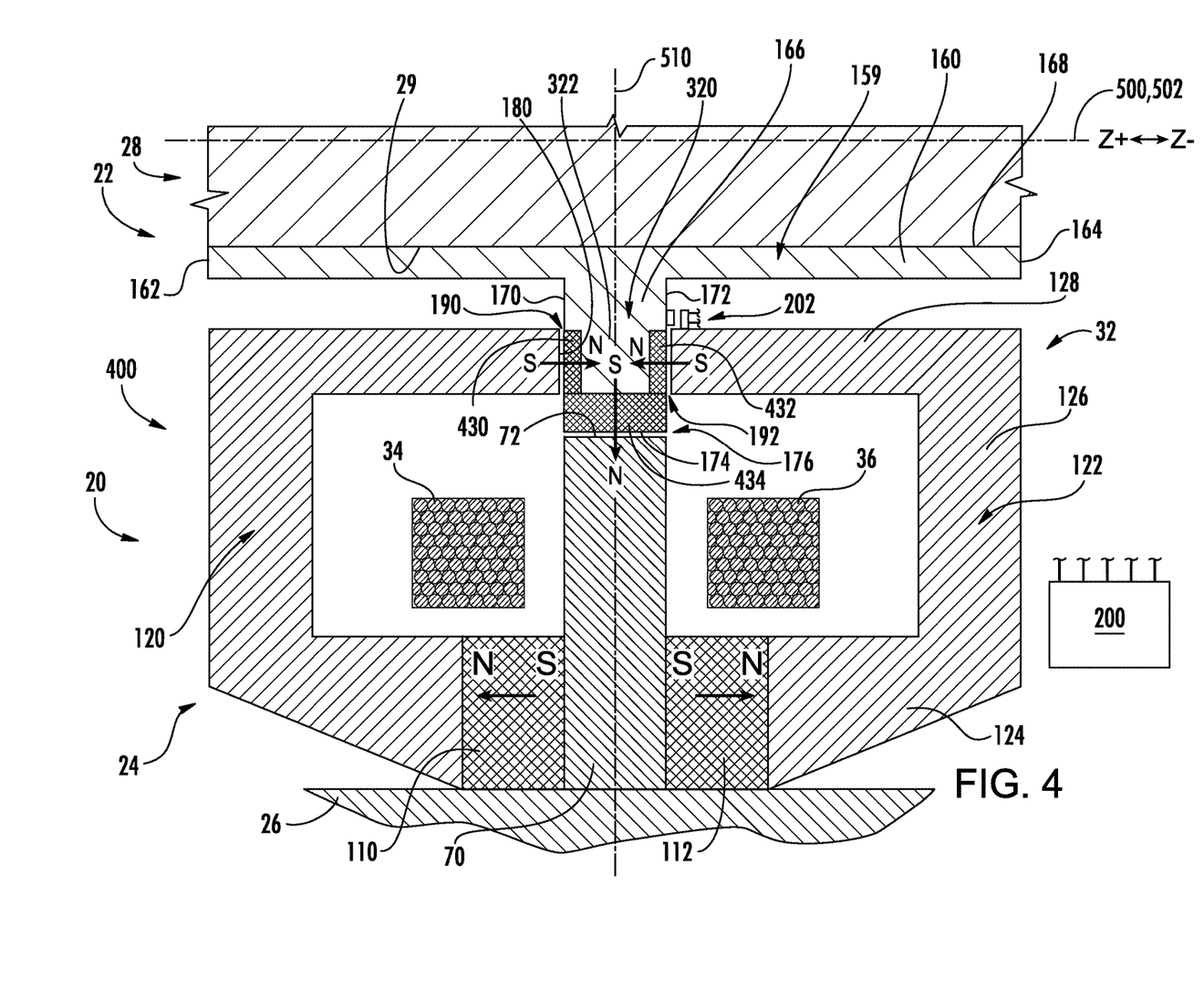
FIG. 4 is a partial, partially schematic central longitudinal axial sectional half view of a third electromagnetic bearing in a compressor.

FIG. 4 shows a system 400 otherwise similar to the system 300 but wherein the laminates 330, 332, 334 are replaced with permanent magnets 430, 432, and 434, respectively. In the illustrated embodiment, the polarities of the magnets and the magnets 110 and 112 are oriented to have the same direction of flux circulation on each side of the centerplane 510, with the two directions being opposite each other. Thus, if the magnets 110 and 112 have north polarity away from the centerplane 510, the magnets 430 and 432 have north polarity toward the centerplane and the magnet 434 has north polarity away from the axes 500, 502.

Figure 5:
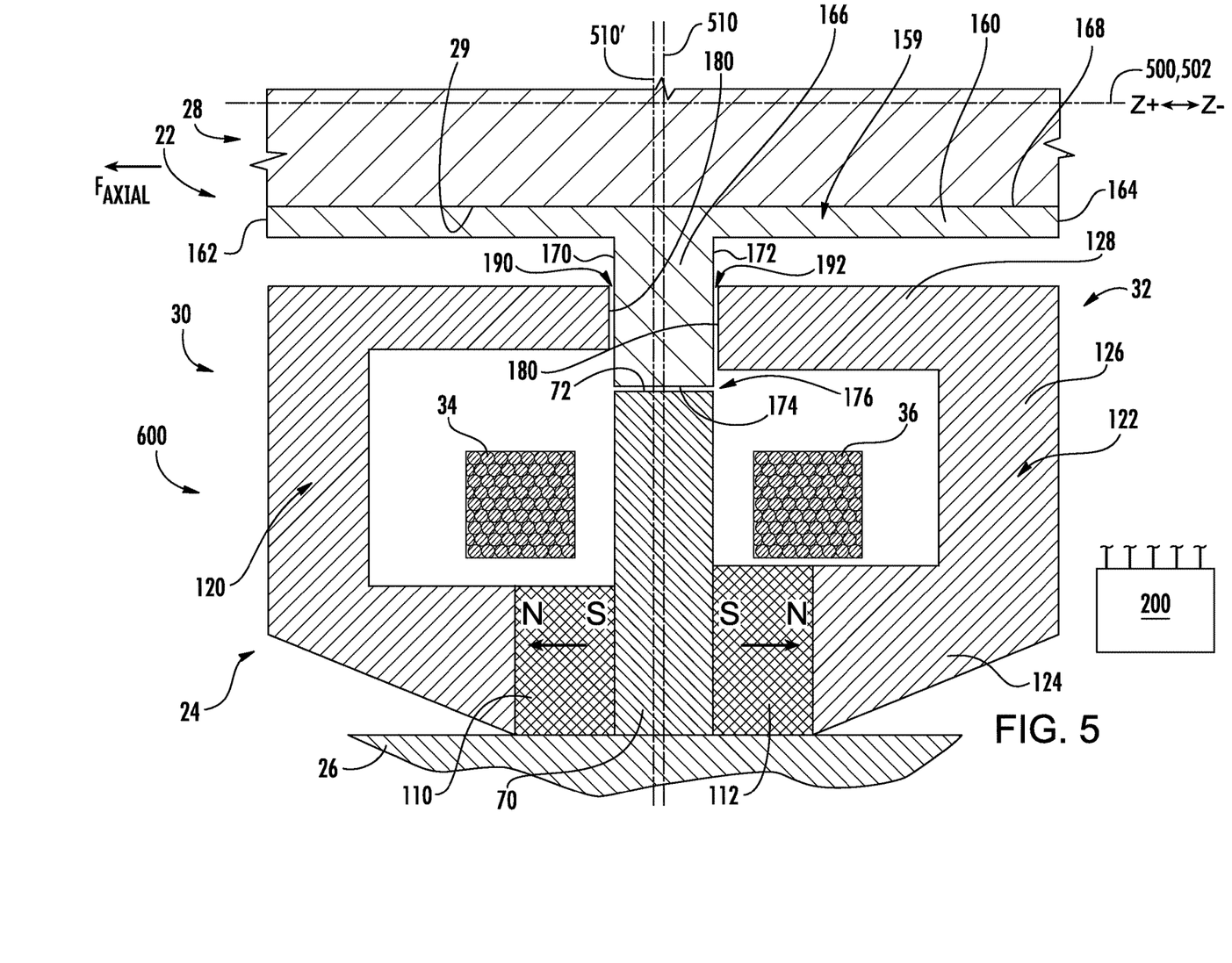
FIG. 5 is a partial, partially schematic central longitudinal axial sectional half view of a fourth electromagnetic bearing in a compressor.

FIG. 5 shows a system 600 having an asymmetry across the transverse centerplane 510. For purposes of discussion, one example of the transverse centerplane in an asymmetric bearing may be defined as a plane along the center of the flange 166.

The exemplary FIG. 5 embodiment shows an asymmetric variant of the FIG. 1 embodiment. However, asymmetric versions of the other embodiments are also possible as are versions having other asymmetries. The asymmetry may be selected to provide a baseline axial bias force to the rotor in the Z– direction to counter a loading force $F_{AXIAL}$ (e.g., due to pressure difference when the bearing is in a compressor or due to gravity if the shaft orientation is vertical) on the rotor in the Z+ direction.

The illustrated asymmetry involves maintaining symmetry between the coils 34 and 36 (e.g., they have the same number of turns and carry a common current in opposite directions). Further coil symmetries include the same cross-sectional shape, position relative to the axes 500, 502, and wire.

Alternative embodiments may have asymmetries between the two coils 34 and 36. Thus, to provide a similar direction of bias force, the second coil 36 could have more turns than the first coil 34 if the two coils were powered in series.

A main illustrated asymmetry is between the rings 110 and 112. The magnet 112 may be, in one or more ways, more powerful and/or have a greater physical dimension than the magnet 110. In the illustrated embodiment, the magnets may be of like materials and like circumferential extent but with the magnet 112 of greater longitudinal cross-sectional area. In the exemplary embodiment, they are of similar longitudinal dimension but the magnet 112 is of greater radial span. With the compressor housing 26 or an adjacent back iron (not shown) of the stator essentially defining a fixed outer diameter, the exemplary magnet 112 thus extends inward to a smaller inner diameter. An additional associated asymmetry is that the pole 122 is correspondingly more massive than the pole 120. Thus, in the exemplary embodiment, the inboard rim surface of the outboard sleeve portion 124 of the second end pole 122 has a larger radial span than that of the first end pole 120 to correspond to the adjacent dimensions of the mating face of the magnet 112. Similarly, the end 180 of the inboard sleeve portion 128 is larger to accommodate the broadened flux distribution. The asymmetry will effectively shift the meeting plane of the two flux distributions to a location 510' axially displaced from the transverse centerplane 510 toward the first end pole.

Exemplary laminates are axial stacks of steel plates (e.g., soft magnetic steel or silicon steel). Use of laminate reduces Eddy loss relative to a single block of steel. Manufacturing tolerances on the physical orientations of the laminates and other components may be much tighter than polarization tolerance. Typically, the relevant surfaces will be within 1.0° or 2.0° of their nominal orientation. However, broader excursions may be intentionally designed in.

FIG. 1 further shows a controller 200. The controller may be integrated with or provided by a controller of the turbomachine (e.g. electric compressor) as a whole or the system (e.g., refrigeration system). The controller may receive user inputs from an input device (e.g., switches, keyboard, or the like) and sensors (not shown, e.g., pressure sensors and temperature sensors at various system locations and, specifically for bearing control, radial position sensors and axial position sensors (e.g., a single Z sensor 202 is shown mounted in the bearing)). The controller may be coupled to the sensors and controllable system components (e.g., valves, the bearings, the compressor motor, vane actuators, and the like) via control lines (e.g., hardwired or wireless communication paths). The controller may include one or more: processors; memory (e.g., for storing program information for execution by the processor to perform the operational methods and for storing data used or generated by the program(s)); and hardware interface devices (e.g., ports) for interfacing with input/output devices and controllable system components.

Other variations involve circumferentially segmenting the permanent magnets. The segmenting may, in some embodiments, create a segmented full annulus (with essentially no circumferential gaps between segments). However, other noteworthy embodiments involve segments separated by gaps. Examples of such segmentation are discussed in PCT/US2016/017943. Similarly, other components such as the laminates may be segmented or continuous. A variation on the laminates 330 and 332 with their surfaces extending axially is to use a spiral of a metallic sheet rather than a concentric group of progressively incrementally sized metallic rings.

With such a pair of segmented permanent magnets 110, 112 (alternatively characterized as two circumferential arrays of permanent magnets) a number of further variations are possible. In a basic variation, all magnets within each of the two circumferential arrays have the same polarity as the other magnets in such array with the polarity of the two arrays being opposite to each other. In yet other variations, the polarities of the individual two magnets of the subunit are opposite each other but the magnets in each array need not be the same polarity.

Contrasted with different alternative prior art bearings, various implementations may have one or more of several advantages. The flux focusing is discussed above. For example, various embodiments may use non-rare earth magnets at least for the rings 110 and 112. This reduces costs. Rare earth magnets are characterized by magnets with use rare earth elements such as dysprosium, terbium, europium, neodymium, samarium, and yttrium. Combined contents of those elements will typically be at least 10.0% by weight (e.g. 10.0% to 50.0%) or at least 20.0%. Neodymium is typically the key element in the main class of rare earth magnets (neodymium magnets), thus non-rare earth magnets may have under 10.0% by weight of this element in particular. Another class is samarium-cobalt magnets (e.g. typically 15% to 45% samarium by weight) Thus, in non-rare earth magnets, samarium may also be below 15.0% or 10.0% by weight. Exemplary non-rare earth magnets are ferrite/ceramic magnets, alnico, manganese bismuth, iron nitride, and the like. However, other embodiments may use rare earth magnets or combinations.

The use of "first", "second", and the like in the description and following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

Where a measure is given in English units followed by a parenthetical containing SI or other units, the parenthetical's units are a conversion and should not imply a degree of precision not found in the English units.

One or more embodiments have been described. Nevertheless, it will be understood that various modifications may be made. For example, when applied to an existing basic system, details of such configuration or its associated use may influence details of particular implementations. Accordingly, other embodiments are within the scope of the following claims.

What is claimed is:

1. A magnetic bearing (20) comprising:
   a rotor (22) to be supported for rotation about an axis (502);
   a stator (24) extending from a first end (30) to a second end (32) and comprising:
   one or more first permanent magnets (110);
   one or more second permanent magnets (112) of polarity substantially opposite to a polarity of the one or more first permanent magnets;
   a first axial winding (34);
   a second axial winding (36);
   a first end pole (120); and
   a second end pole (122) the magnetic bearing being a thrust bearing without radial windings,
   wherein:
   the rotor comprises a metallic core (160, 28) having a radial flange;
   the metallic core radial flange carries an axially laminated metallic jacket (334); and
   the first end pole and second end pole extend radially inboard of the axially laminated metallic jacket.

2. The magnetic bearing of claim 1 wherein the one or more first permanent magnets and the one or more second permanent magnets are non-rare earth magnets.

3. The magnetic bearing of claim 1 lacking stator laminates.

4. The magnetic bearing of claim 1 wherein the flange carries:
   a radially laminated first laminate (330) adjacent the first end pole; and
   a radially laminated second laminate (332) adjacent the second end pole.

5. The magnetic bearing of claim 4 wherein:
   the radially laminated first laminate (330) is a continuous annulus; and
   the radially laminated second laminate (332) is a continuous annulus.

6. The magnetic bearing of claim 1 wherein:
   the one or more first permanent magnets is a first permanent magnet ring; and
   the one or more second permanent magnets is a second permanent magnet ring.

7. The magnetic bearing of claim 6 wherein:
   the first permanent magnet ring is a first continuous full annulus ring; and the second permanent magnet ring is a second continuous full annulus ring.

8. The magnetic bearing of claim 1 wherein the stator further comprises:
a central back iron (70) between the one or more first permanent magnets and the one or more second permanent magnets.

9. The magnetic bearing of claim 8 wherein:
the central back iron (70) has an inner diameter rim radially inboard of the first axial winding and the second axial winding.

10. A method for using the magnetic bearing of claim 1, the method comprising running current through:
the first axial winding; and
the second axial winding,
so as to:
control axial force or position by simultaneously powering the first axial winding and the second axial winding.

11. The method of claim 10 wherein:
the first and second axial windings are powered by at least one H bridge amplifier.

12. The method of claim 10 wherein:
the first and second axial windings are each powered by a respective associated H-bridge amplifier.

13. A machine comprising a bearing according to claim 1 and further comprising a controller (200) coupled to the magnetic bearing.

14. A magnetic bearing (20) comprising:
a rotor (22) to be supported for rotation about an axis (502);
a stator (24) extending from a first end (30) to a second end (32) and comprising:
one or more first permanent magnets (110);
one or more second permanent magnets (112) of polarity substantially opposite to a polarity of the one or more first permanent magnets;
a non-laminate central back iron (70) between the one or more first permanent magnets and the one or more second permanent magnets;
a first axial winding (34);
a second axial winding (36);
a first end pole (120); and
a second end pole (122),
wherein:
the rotor has a radial flange including an axially laminated metallic jacket (334); and
the first end pole and second end pole extend radially inboard of the axially laminated metallic jacket.

15. A magnetic bearing (20) comprising:
a rotor (22) to be supported for rotation about an axis (502) and having a radial flange;
a stator (24) extending from a first end (30) to a second end (32) and comprising:
one or more first permanent magnets (110);
one or more second permanent magnets (112) of polarity substantially opposite to a polarity of the one or more first permanent magnets;
a first axial winding (34);
a second axial winding (36);
a first end pole (120); and
a second end pole (122), the first end pole and second end pole facing opposite faces of the radial flange,
wherein:
the rotor radial flange includes an axially laminated metallic jacket (334); and
the first end pole and second end pole extend radially inboard of the axially laminated metallic jacket.

16. The magnetic bearing of claim 15 wherein the radial flange is a central radial flange.

17. The magnetic bearing of claim 15 having asymmetry for providing a baseline axial bias force.

18. The magnetic bearing of claim 15 wherein viewed in central axial half section:
a first flux path flows:
axially-out of the one or more one or more first permanent magnets;
radially-in, and axially-in the first end pole (120);
across a first axial airgap (190);
axially into and radially out from the radial flange;
across a radial airgap (176) to an inner diameter surface of a stator pole (70);
radially outward in the stator pole (70); and
axially outward to return to the first end pole; and
a second flux path flows:
axially-out of the one or more one or more second permanent magnets;
radially-in, and axially-in the second end pole (122);
across a second axial airgap (192);
axially into and radially out from the radial flange;
across the radial airgap to the inner diameter surface of the stator pole;
radially outward in the stator pole; and
axially outward to return to the second end pole.

* * * * *